United States Patent [19]
Wendlandt et al.

[11] Patent Number: 5,943,390
[45] Date of Patent: *Aug. 24, 1999

[54] STORAGE PHOSPHOR CASSETTE WITH REDUCED WEIGHT AND COST

[75] Inventors: William C. Wendlandt, Rochester; William F. Snyder, Hilton, both of N.Y.

[73] Assignee: Eastman Kodak Company, Rochester, N.Y.

[*] Notice: This patent is subject to a terminal disclaimer.

[21] Appl. No.: 08/941,119

[22] Filed: Sep. 30, 1997

[51] Int. Cl.⁶ .................................................... G03B 42/02
[52] U.S. Cl. ........................ 378/189; 250/483.1; 378/167
[58] Field of Search ..................... 378/167, 176, 378/182, 184, 185, 187, 188, 189; 250/483.1, 484.2, 484.4, 487.1

[56] References Cited

U.S. PATENT DOCUMENTS

| | | | |
|---|---|---|---|
| 2,817,020 | 12/1957 | Akers | 250/68 |
| 3,157,787 | 11/1964 | Kendziorski, Jr. et al. | 250/68 |
| 4,467,919 | 8/1984 | Bengtsson et al. | 206/455 |
| 5,246,523 | 9/1993 | Minnick et al. | 156/306.6 |
| 5,248,367 | 9/1993 | Minnick et al. | 156/306.6 |
| 5,248,368 | 9/1993 | Minnick et al. | 156/306.6 |
| 5,248,369 | 9/1993 | Minnick et al. | 156/306.6 |
| 5,248,373 | 9/1993 | Minnick et al. | 156/306.6 |
| 5,265,148 | 11/1993 | Bauer et al. | 378/182 |
| 5,413,901 | 5/1995 | Florens et al. | 378/182 X |
| 5,684,853 | 11/1997 | Fick et al. | 378/177 X |

FOREIGN PATENT DOCUMENTS

0 598 428 A1  11/1993  European Pat. Off. .

*Primary Examiner*—David P. Porta
*Attorney, Agent, or Firm*—William F. Noval

[57] ABSTRACT

An x-ray cassette for computed radiography comprising: a top panel and a bottom panel, at least one panel formed from a material the panel being that which incident x-rays will pass through comprising a metal/thermoplastic/metal sandwich; the top and bottom panels being fastened for holding the front and the back panels together and create a cavity between the panels; and a storage phosphor device contained within the cavity between the first panel and the second panel.

12 Claims, 7 Drawing Sheets

STORAGE PHOSPHOR CASSETTE WITH REDUCED WEIGHT AND COST

CROSS-REFERENCE TO RELATED APPLICATIONS

The present application is related to U.S. Application Ser. No. 08/940,773, based on Docket No.:76,534 filed on the same day as the present application, by Robertson et al, and entitled, "Improved X-ray Cassette".

FIELD OF THE INVENTION

The invention relates generally to the field of X-ray cassettes and in particular to X-ray cassettes used in Computer Radiography

BACKGROUND OF THE INVENTION

In the field of computed radiography, a photographic element has an image formed thereon by x-rays. The element is later stimulated to emit a radiation pattern that is indicative of the image formed by the x-rays. Typically, storage phosphors are used to capture radiographic images from incident x-rays. Most radiographic procedures are carried out within normal room lighting conditions, accordingly, a primary requirement for any computed radiography x-ray cassette is to shield the storage phosphor from exposure by ambient light.

In normal computer radiographic procedures, the portion of the patient being imaged is placed between an x-ray source, and an x-ray cassette containing the storage phosphor element used to record incident X-rays. When the patient is irradiated, the x-ray beam is selectively attenuated by differences in the density of the patient tissue and bone structure. When the imaging beam strikes the x-ray cassette, a portion of the beam is further attenuated by the front panel of the cassette, the remaining x-ray beam then passes through the storage phosphor, causing a direct exposure to the surface of the storage phosphor. The storage phosphor can then be scanned by a laser to yield the resulting image. The residual small portion of the imaging beam is further attenuated by a thin sheet of lead foil applied to the interior face of the back panel, or the back side of the storage phosphor screen, leaving only a very small fraction of the original beam to escape through the back surface of the cassette.

To minimize irradiation of the patient, it is desirable to minimize the attenuation of the imaging beam, thus, a third requirement for x-ray cassette design is the utilization, for the front panels of such cassettes, of materials which do not substantially attenuate an x-ray beam. Additionally, such front panels must provide for uniform attenuation, so as to not alter the pattern of attenuation created by the patient.

Materials which are lower in atomic weight are more transparent to x-rays, thus beryllium would be an excellent material for x-ray cassettes, were it not for its great cost, and toxicity. Thermoplastic materials which are primarily compounds of carbon, hydrogen, and oxygen are also suitable, although they generally lack structural strength and stiffness required. Carbon fiber reinforced thermoset resins are commonly used, in spite of their great cost. Aluminum is generally suitable, in the wavelengths used for general radiography, however it is heavy as well as having undesirable characteristics at longer wavelengths.

From the foregoing description, it should be apparent that it would be desirable to have an x-ray cassette that can be widely utilized to provide lower cost materials, and having equally high image quality, while minimizing the imaging beam attenuation of the front panel of the cassette, to reduce patient irradiation levels. It would be further desirable to provide a cassette which is structurally equivalent to the current cassette; and which is lighter in weight, for portability.

SUMMARY OF THE INVENTION

The present invention is directed to overcoming one or more of the problems set forth above. Briefly summarized, according to one aspect of the present invention, an x-ray cassette for computed radiography comprising: a top panel and a bottom panel, at least one panel formed from a material comprising a metal/thermoplastic/metal sandwich, that panel being the panel which incident x-rays will pass through; fastening means for holding the front and the back panels together and create a cavity between the panels; and a storage phosphor device contained within the cavity between the first panel and the second panel.

The invention preferably employs aluminum as the metal sheets and polypropylene as the thermoplastic.

An improved x-ray cassette for computer radiography has been designed and fabricated, utilizing prepainted panels of a composite aluminum/polypropylene/aluminum material manufactured by Hoogovens, Bv, of the Netherlands. This material, developed for use in the automotive industry, comprises a 0.064" thick solid polypropylene core, to each side of which is laminated a 0.008" thick aluminum sheet. This construction is slightly stiffer than the 0.063" thick vinyl clad solid aluminum panel used previously, and is 70% lighter than the prior art aluminum panels.

The complete improved cassette results in a reduction in overall weight and cost.

The composite panel material utilized in the construction of the improved cassette has only 0.016" total thickness of aluminum, approximately 25% of the aluminum used in the prior panel, whereas the majority of the thickness of the improved cassette panel is comprised of polypropylene, which is highly transparent to x-rays. Measured attenuation of the improved panel is 8% at 100 kv excitation, 10% at 80 kv excitation, and 12% at 60 kv excitation. This attenuation performance is closer to the performance level of carbon fiber panels, however, the material cost for the aluminum/polypropylene/aluminum composite panel is approximately equivalent to the material cost for vinyl clad 0.063" solid aluminum panels, thus the improved cassette offers the potential for maintaining similar patient irradiation, without the high material cost for carbon fiber.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

Hylite is approximately 50% lighter than Aluminum and is approximately equal in cost.

Hylite is approximately the same weight as Carbon Fiber Composite (as currently used in CR Cassettes) and is approximately 1/10 the cost.

The absorption of the Hylite panel is only slightly higher than carbon fiber at the higher kV's.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

An improved x-ray cassette for computed radiography utilizing panels of a composite aluminum/polypropylene/aluminum material manufactured by Hoogovens, Bv, of the Netherlands. This material, originally developed for use in the automotive industry, comprises a 0.064" thick solid polypropylene core, to each side of which is laminated a 0.008" layer of aluminum. This construction provides a slightly stiffer cassette than the 0.063" thick vinyl clad solid aluminum panel used previously, and is 70% lighter than the prior art panel.

Figure 1:
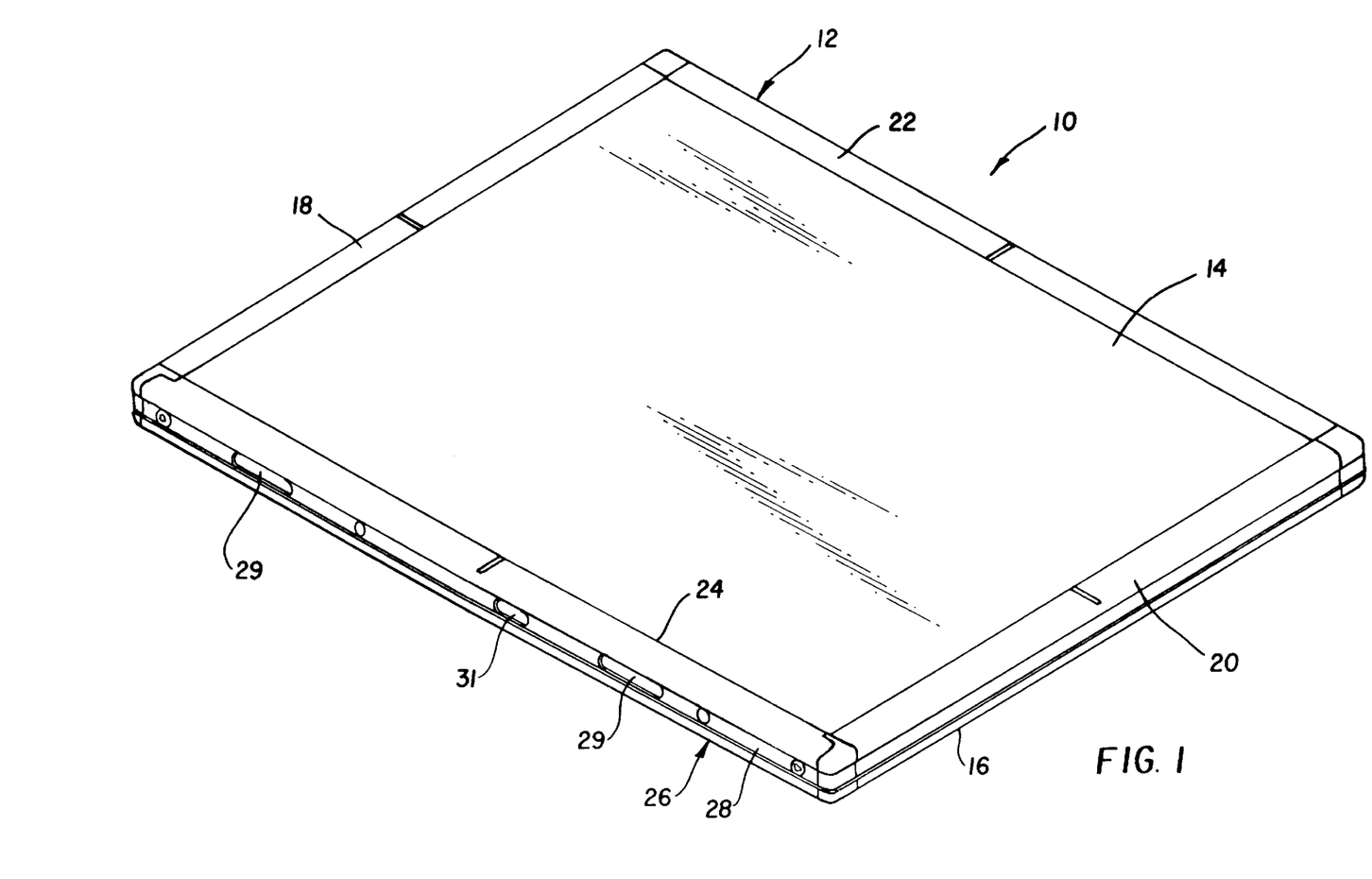
FIG. 1 is a perspective view of a storage phosphor cassette according to the present invention.
Figure 2:
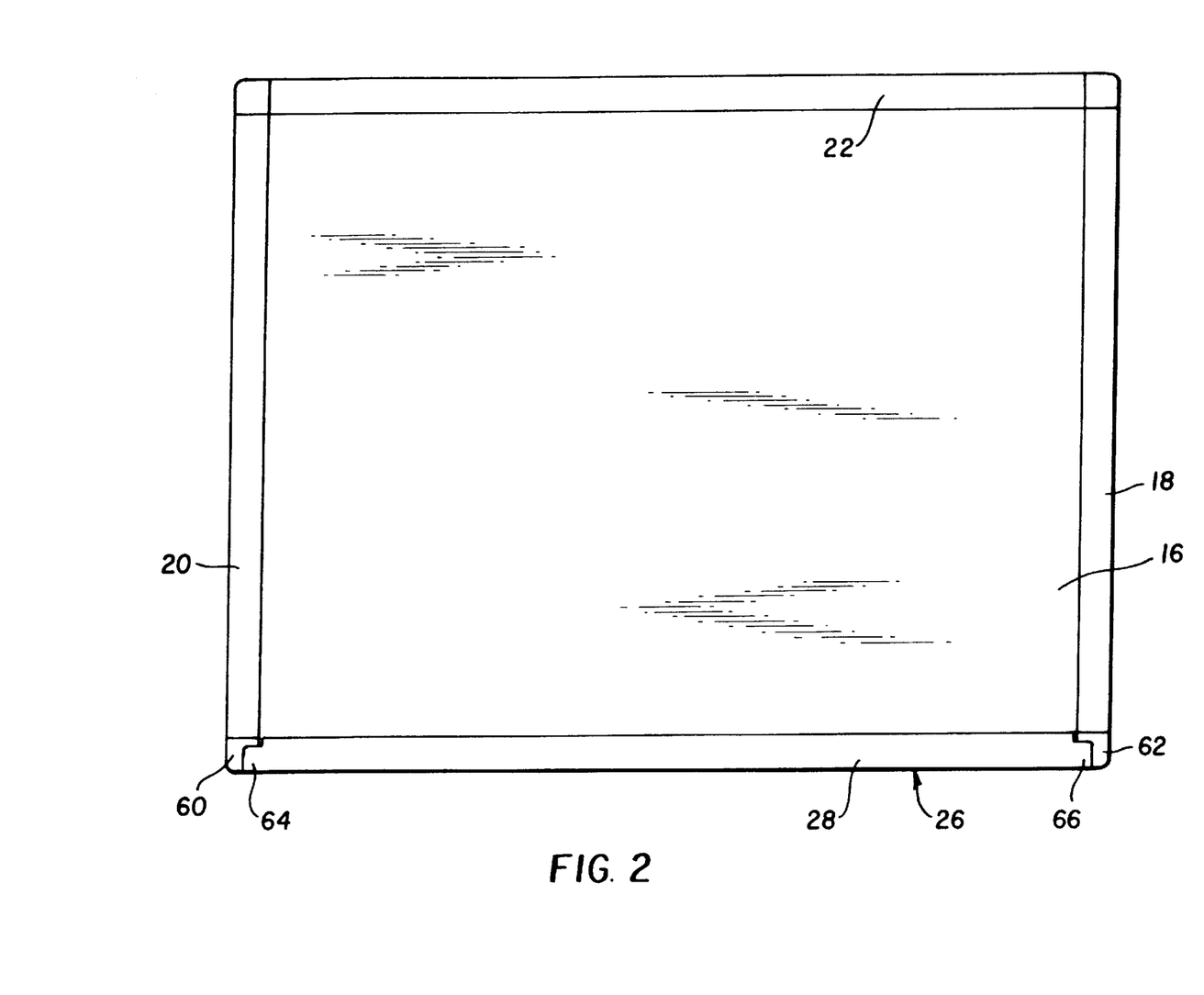
FIG. 2 is a bottom view of the cassette of FIG. 1.
Figure 3:
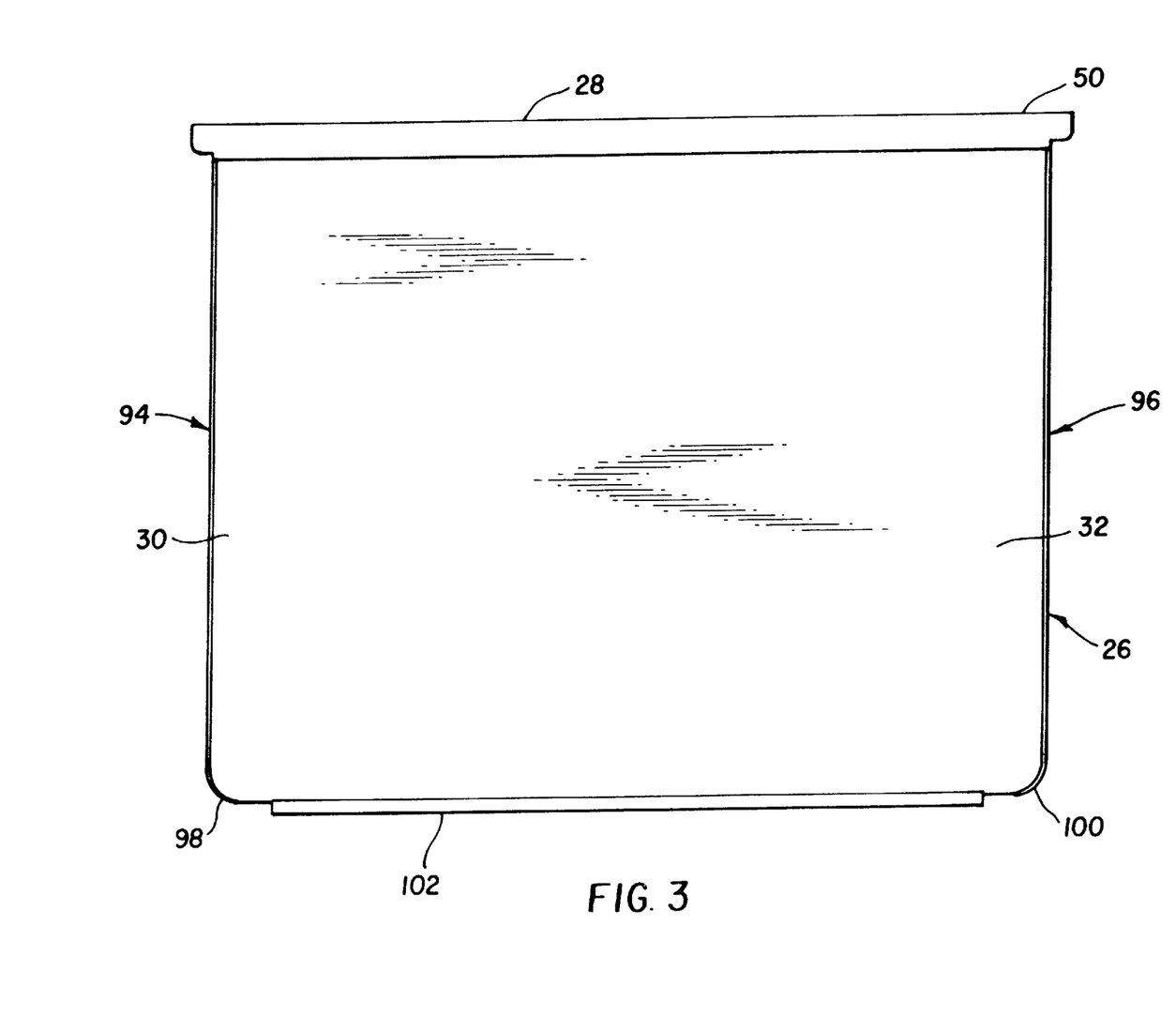
FIG. 3 is a is a top view of the storage phosphor assembly of FIG. 1.

In the preferred embodiment as shown in FIG. 1, the storage phosphor cassette 10 includes shell 12 including upper and lower rectangular panels 14, 16 first and second side members 18, 20 and front end member 22. Members 18, 20, 22 join panels 14 and 16 to form a five sided cavity having an open end 24. FIG. 2 illustrates a back view of cassette 10 having storage phosphor assembly 26 including a back end member 28 an insert plate 30 having an upper face and being cantilevered from the back end member 28. FIG. 3 illustrate an x-ray storage phosphor 32 is disposed on the upper surface plate 30. Member 28 includes apertures 29, 31 for access to the interior of member 28 to latch and unlatch a latch bar slidably mounted therein. Storage phosphor assembly 26 is removably contained in shell 12 such that back end member 28 closes off the open end 24 of shell 12 providing a light tight enclosure for storage phosphor 32.

The upper and lower rectangular panels 14, 16 of the improved cassette 10 will be constructed from the above described Hylite material. While the upper and lower panels 14, 16 will be thicker overall than those of prior cassettes, the attenuation of the imaging beam from the lower panel 16 is less. There is less attenuation because the Hylite composite panel material utilized in the construction of the improved cassette has only 0.016" total thickness of aluminum, approximately 25% of the aluminum used in the prior panel, whereas the majority of the thickness of the improved cassette panel is comprised of polypropylene, which is highly transparent to x-rays. The upper panel 16 will have a slightly higher attenuation than carbon fiber. Measured attenuation of the improved panel is 8% at 100 kv excitation, 10% at 80 kv excitation, and 12% at 60 kv excitation. This attenuation performance is similar to the performance level of carbon fiber panels, however, the material cost for the aluminum/polypropylene/aluminum composite panel is approximately equivalent to the material cost for vinyl clad 0.063" solid aluminum panels, thus the improved cassette offers a potential for cost savings while maintaining similar attenuation.

Figure 4:
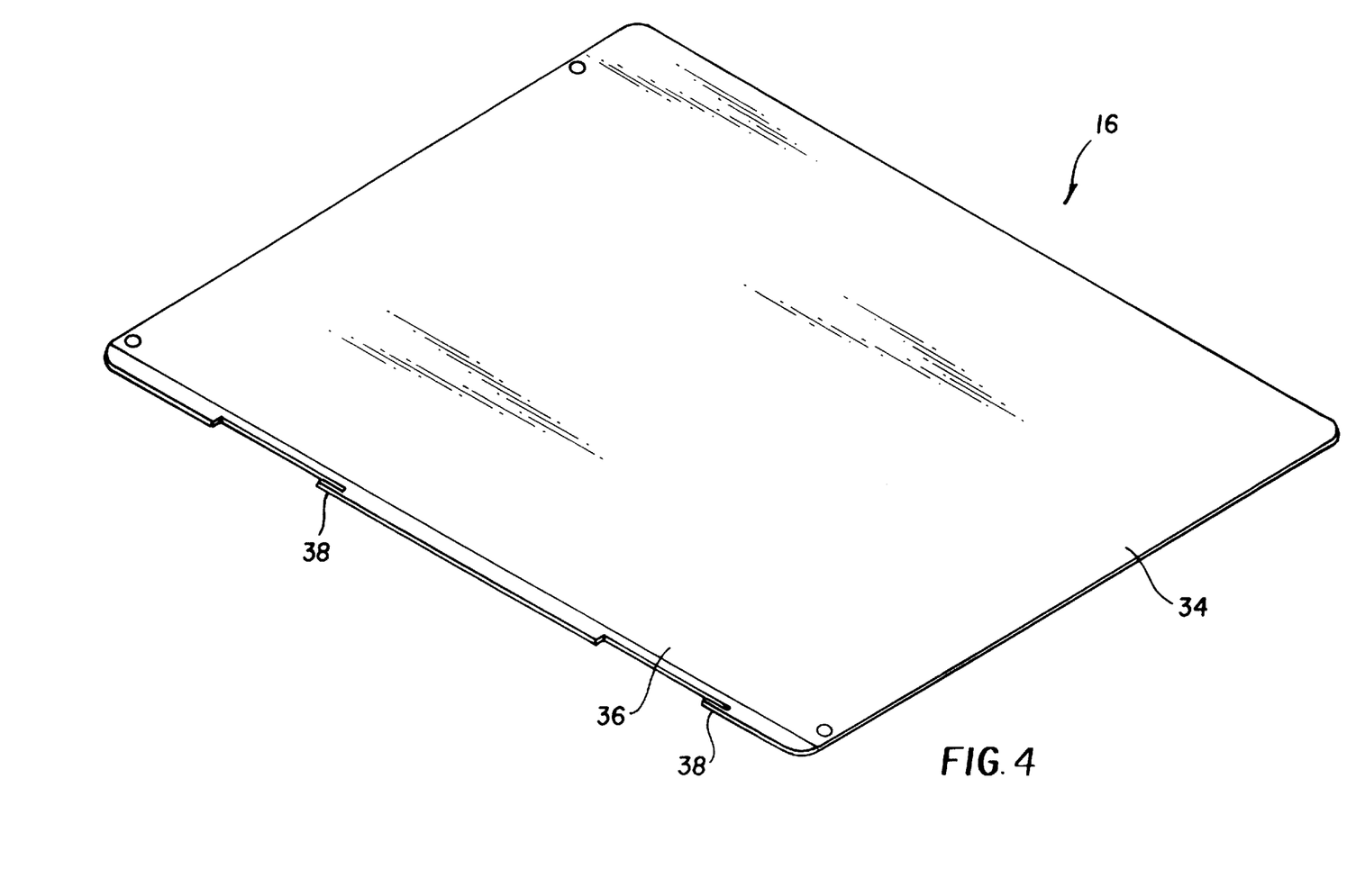
FIG. 4 is a perspective view of the bottom panel.
Figure 5:
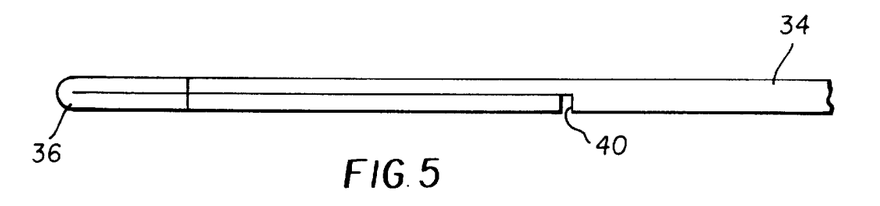
FIG. 5 is a diagram illustrating J-strip interface with the bottom panel.

The design as envisioned by the preferred embodiment in order to accommodate J-strip latch 36 is seen referring to FIGS. 4 and 5, which are views of lower latch panel 16. FIG. 4 being a perspective view and FIG. 5 illustrating J-strip latch segment 36. It is necessary to adhere the bottom panel 16 to the J-strip latch segment. An adhesive bonding is envisioned by the present invention is intended to keep the J-strip latch 36 attached to the Hylite material during the manufacturing process.

Figure 6A:
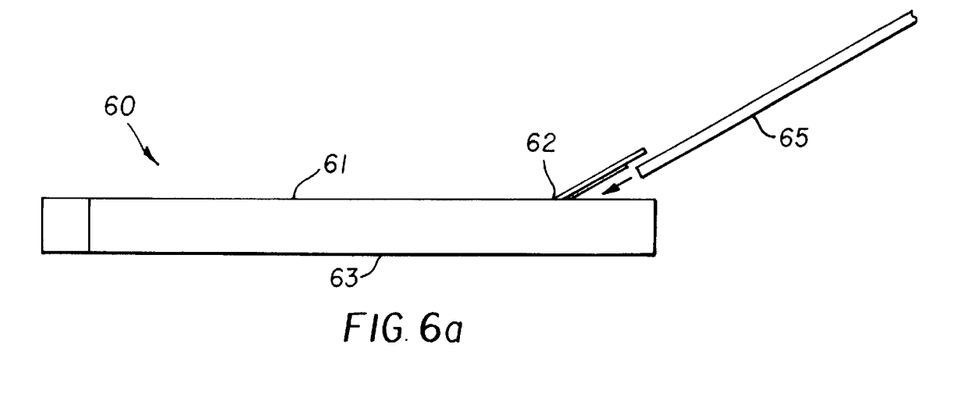
FIGS. 6a and 6b are illustrations of another embodiment of the invention.
Figure 6B:
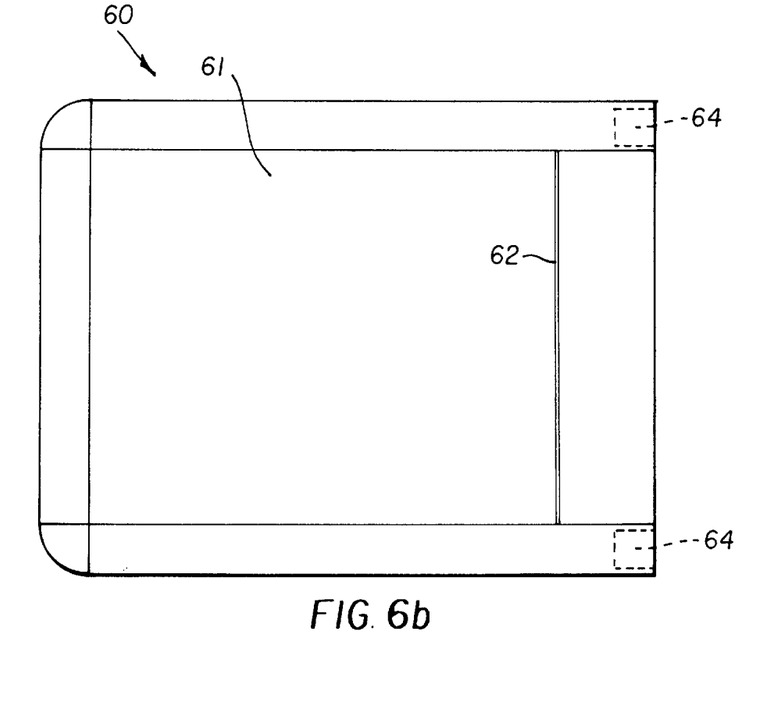

Referring to FIGS. 6a and 6b a second embodiment of the invention shows cassette 60 that can have top panel 63 and bottom panel 61 made from the Hylite material as discussed for the previously embodiment. Living hinge 62 within bottom panel 61 open to allow phosphor screen to be inserted between the cavity formed between panels 61, 63. The usage of Hylite for one or both of panels 61, 63 yields the resulting advantages for weight, and cost that has been previously discussed.

Figure 7A:
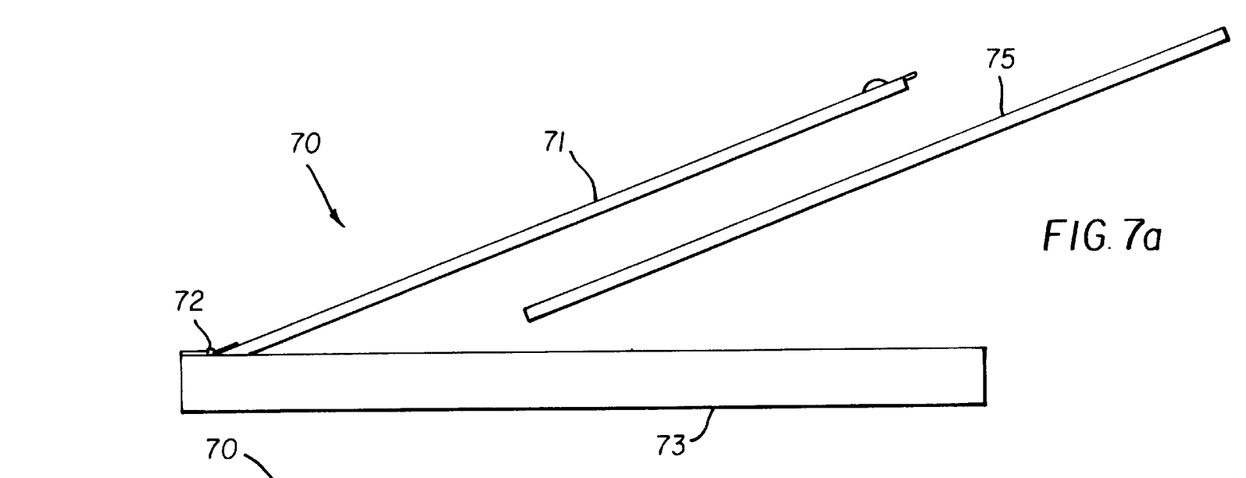
FIGS. 7a and 7b are illustrations of another embodiment of the invention.
Figure 7B:
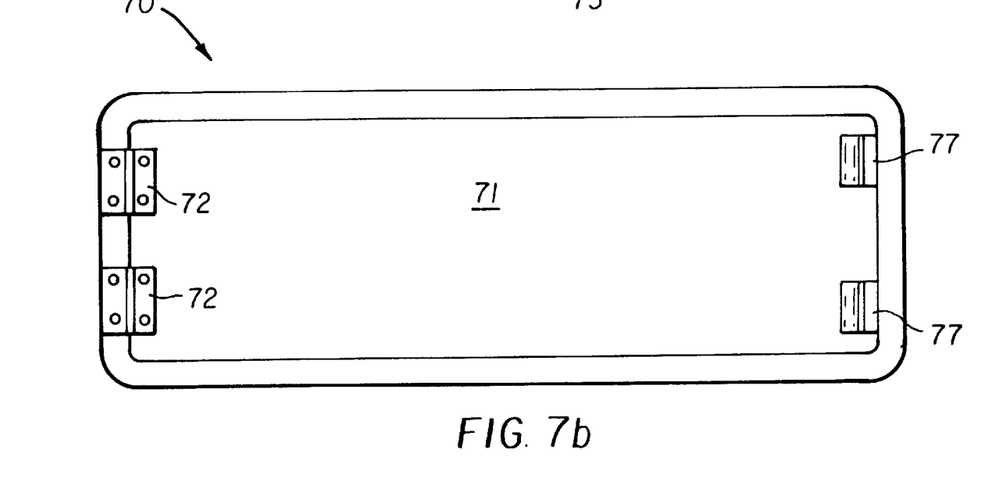

Referring to FIGS. 7a and 7b a third embodiment of the invention shows cassette 70 that can have top panel 73 and bottom panel 71 made from the Hylite material as discussed for the previously embodiment. Hinges 62 within bottom panel 71 open to allow phosphor screen to be inserted between the cavity formed between panels 71, 73. The usage of Hylite for one or both of panels 71, 73 yields the resulting advantages for weight, and cost, that has been previously discussed.

Figure 8A:
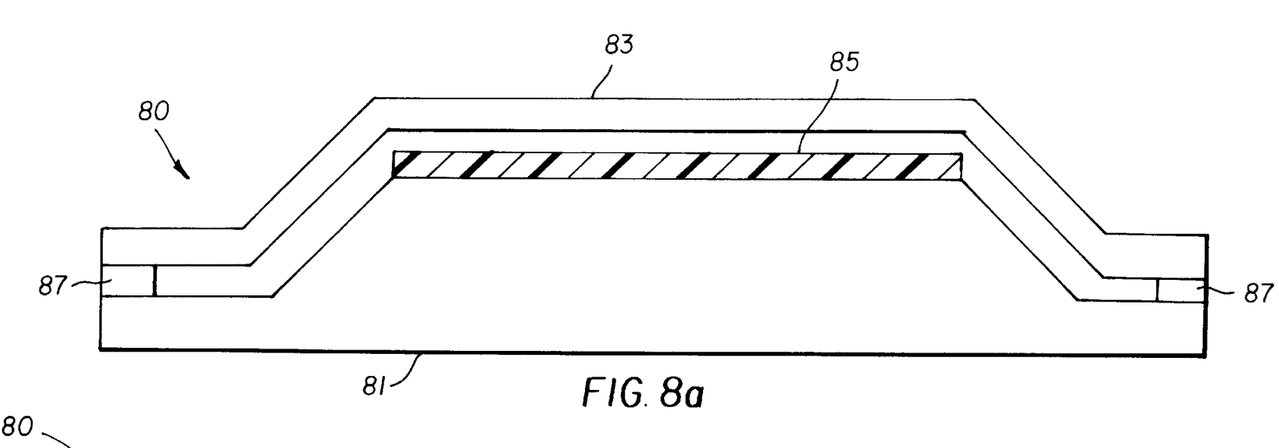
FIGS. 8a and 8b are illustrations of another embodiment of the invention.
Figure 8B:
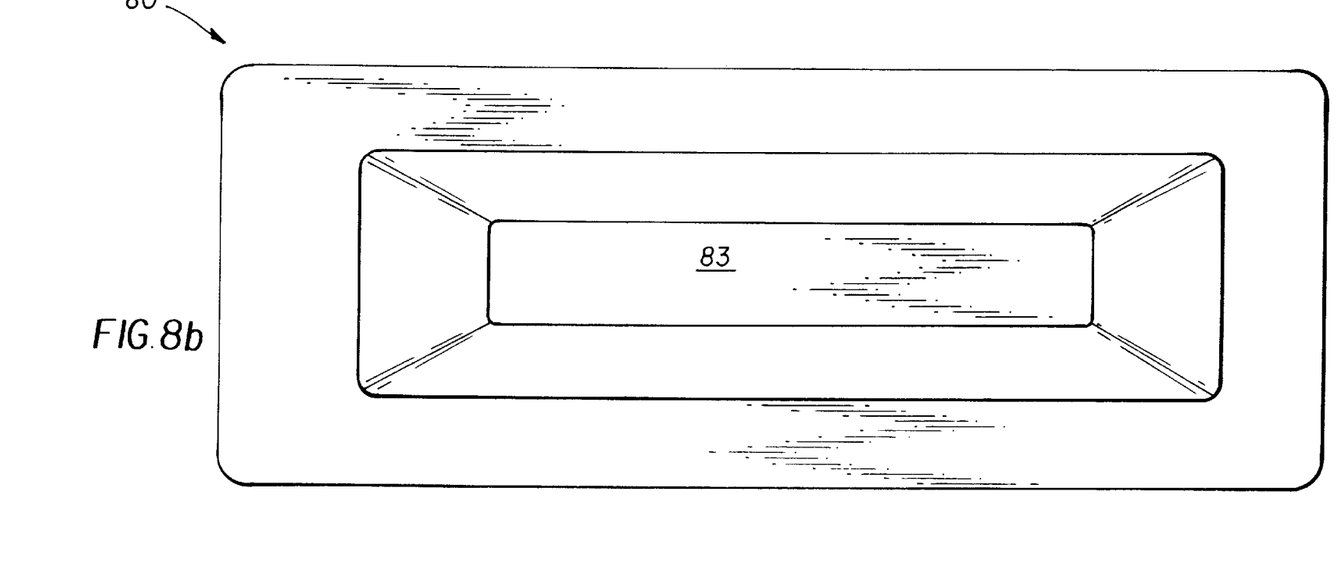

Referring to FIGS. 8a and 8b a forth embodiment of the invention shows cassette 80 that can have top panel 83 and bottom panel 81 made from the Hylite material as discussed for the previously embodiment. The top panel 83 is lifted off bottom panel 81 to open the cassette 80 to allow phosphor screen 85 to be scanned 81, 83. Latches 87 then secure panels 81, 83. The usage of Hylite for one or both of panels 81, 83 yields the resulting advantages for weight, and cost, that has been previously discussed.

The foregoing description of the preferred embodiments discloses the best ways known to the inventor of practicing the invention. However, the breadth accorded to the invention should be determined by the appended claims.

| PARTS LIST | |
|---|---|
| 10 | cassette |
| 12 | shell |
| 14, 16 | upper and lower rectangular plates |
| 18, 20 | first and second side members |
| 22 | front end member |
| 24 | open end |
| 26 | storage phosphor assembly |
| 28 | back end member |
| 30 | insert plate |
| 32 | storage phosphor |
| 34 | front segment |
| 36 | latch segment |
| 38 | latch ears |
| 40 | recess |
| 60 | cassette |
| 61 | top panel |
| 63 | bottom panel |
| 65 | phosphor screen |
| 70 | cassette |
| 71 | top panel |
| 72 | hinge |
| 73 | bottom panel |
| 75 | phosphor screen |
| 80 | cassette |
| 81 | top panel |
| 82 | hinge |
| 83 | bottom panel |

-continued

PARTS LIST

| 85 | phosphor screen |
| 87 | latches |

What is claimed is:

1. An x-ray cassette for computed radiography comprising:
   a top panel and a bottom panel, each panel formed from a material being that which incident x-rays will pass through comprising a metal/thermoplastic/metal sandwich;
   fastening means for holding the front and the back panels together and create a cavity between the panels; and
   a storage phosphor device contained within the cavity between the first panel and the second panel.

2. The cassette of claim one wherein the metal sheets are made of aluminum.

3. The cassette of claim 1 wherein the thermoplastic is polypropylene.

4. The cassette of claim 1 further comprising abrasion prevention means for protecting the storage phosphor device contained within the cavity between the first panel and the second panel.

5. The cassette of claim 4 wherein the abrasion prevention means is selected from one of: cloth; foam; or felt.

6. The cassette of claim 1 further comprising a rigid member that supports the storage phosphor device contained within the cavity between the first panel and the second panel.

7. The cassette of claim 1 wherein the storage phosphor device is a flexible member.

8. An x-ray cassette for computed radiography comprising:
   a top panel and a bottom panel, each of the panels being intended for transmitting incident x-rays being formed from a material comprising a aluminum/polypropylene/aluminum sandwich;
   fastening means for holding the front and the back panels together and create a cavity between the panels; and
   a storage phosphor device contained within the cavity between the first panel and the second panel.

9. The cassette of claim 8 further comprising abrasion prevention means for protecting the storage phosphor device contained within the cavity between the first panel and the second panel.

10. The cassette of claim 8 wherein the abrasion prevention means is selected from one of: cloth; foam; or felt.

11. The cassette of claim 8 further comprising a rigid member that supports the storage phosphor device contained within the cavity between the first panel and the second panel.

12. The cassette of claim 8 wherein the storage phosphor device is a flexible member.

* * * * *